United States Patent [19]

Mauro et al.

[11] Patent Number: 5,643,519
[45] Date of Patent: Jul. 1, 1997

[54] DEVICE AND METHOD FOR PERSONALIZING TIRES

[75] Inventors: Charles R. Mauro, Wheatridge; Donald W. Radford, Ft. Collins, both of Colo.

[73] Assignee: Charles Mauro Enterprises, Inc., Wheatridge, Colo.

[21] Appl. No.: 425,935

[22] Filed: Apr. 19, 1995

Related U.S. Application Data

[63] Continuation-in-part of Ser. No. 92,553, Jul. 16, 1993, abandoned, which is a continuation-in-part of Ser. No. 904,189, Jun. 24, 1992, Pat. No. 5,288,449.

[51] Int. Cl.$^6$ ............................ B29C 65/02; B29C 35/00
[52] U.S. Cl. ........................ 264/219; 156/116; 156/421.6; 264/326; 264/DIG. 46; 425/26; 425/DIG. 13
[58] Field of Search ............................ 264/219, 315, 264/326, 236, 328.3, DIG. 46; 156/116, 421.6; 425/26, DIG. 13

[56] References Cited

U.S. PATENT DOCUMENTS

| | | |
|---|---|---|
| 1,371,501 | 3/1921 | McLane . |
| 3,113,902 | 12/1963 | Dismuke ........................ 156/116 |
| 3,318,752 | 5/1967 | Pollock ........................ 156/116 |
| 4,318,436 | 3/1982 | Shurman ....................... 156/116 |
| 5,288,449 | 2/1994 | Mauro ........................... 156/116 |
| 5,382,402 | 1/1995 | Espie et al. .................. 156/421.6 |

FOREIGN PATENT DOCUMENTS 53-25678  3/1978  Japan ........................ 264/236

Primary Examiner—Mathieu D. Vargot
Attorney, Agent, or Firm—John L. Isaac

[57] ABSTRACT

A device for producing raised lettering on the sidewall of an elastomeric line includes a mechanism for mounting the tire in position to expose its outer sidewall. A mold member is provided having front and rear surfaces, an outer boundary, and an axial opening defining a radially inner boundary. The mold member is sized and shaped to cover the exposed outer sidewall of the tire with the front surface thereof when the tire is disposed on the mounting mechanism. A plurality of annular channels are defined in the mold member front surface radially spaced between the inner and outer boundaries of the mold member. A plurality of support members are each adapted for holding an alphanumeric elastomeric member in the form of the mirror image of a preselected alphanumeric symbol. The support members include an arrangement for selectively interlocking the support members with each other to form a series of symbols into a preselected legend for producing the raised lettering. A device is provided for securing each of the support members to one of the radially spaced channels for sliding movement therealong, the support member interlocking device providing sufficient fluctuation between connected support member to permit positioning of a series of the interlocked support members along any selected one of the spaced channels. A mechanism is provided for positioning the mold member against the outer sidewall of the tire and includes a device for aligning and centering the mold member against the tire sidewall. Finally, an electrical heating element is provided within the mold member and disposed proximate the channels to heat and fuse the elastomeric symbols directly to the outer sidewall of the tire.

23 Claims, 4 Drawing Sheets

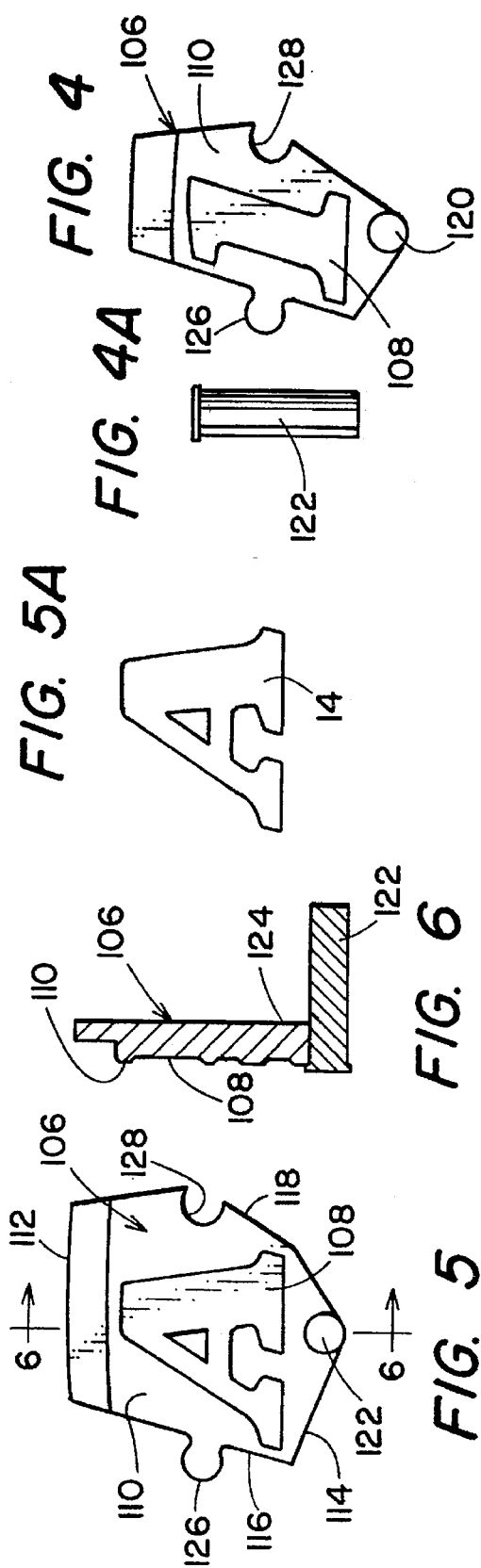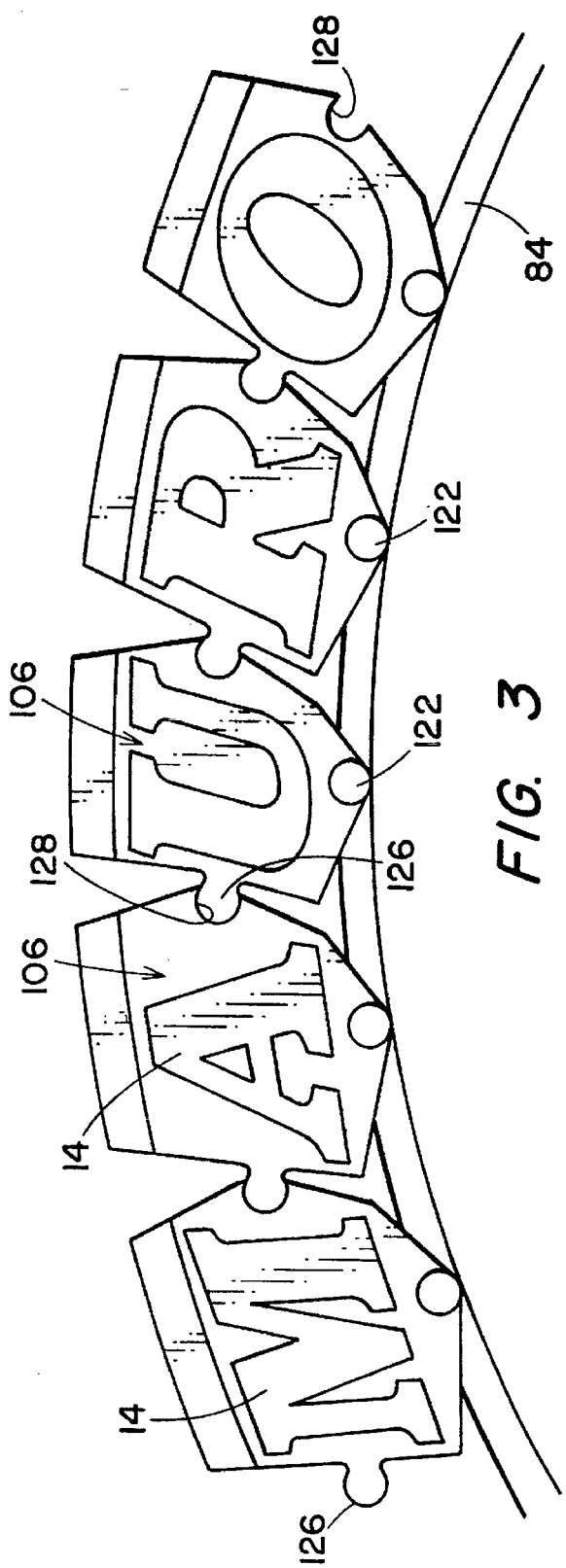

DEVICE AND METHOD FOR PERSONALIZING TIRES

RELATED APPLICATION

This application is a continuation-in-part of U.S. patent application Ser. No. 08/092,553, which was filed on Jul. 16, 1993 and is now abandoned, which in turn was a continuation-in-part of U.S. patent application Ser. No. 07/904,189, which was filed on Jun. 24, 1992 and is now U.S. Pat. No. 5,288,449 issued Feb. 22, 1994.

BACKGROUND OF THE INVENTION

1. Field of the Invention

The present invention relates generally to devices and techniques for manufacturing tires and, more particularly, to devices and techniques for applying legends and symbols to the sidewalls of vehicular tires. Specifically, the present invention relates to an improved device and method for aftermarket application of raised lettering to the sidewalls of existing vehicular tires.

2. Description of the Prior Art

Since the advent of vehicular rubber tires, it has been desirable to place some sort of legend or symbol on the sidewalls of the tires. Such symbols and legends have included information about the tire, such as pressure ranges, the construction configuration, and similar type of information, as well as manufacturer identification, trademarks and the like. Consequently, numerous techniques have been developed for the application of symbols or various marking indicia on the sidewalls of vehicular tires.

U.S. Pat. Nos. 3,232,816, 3,318,752 and 3,729,041 all disclose techniques for applying "Whitewall" type strips to the sidewalls of tires. One method of applying indicia or marking to the sidewalls of tires is to incorporate such markings in the original molding for the tire casing and is applied when the tire is being initially formed. U.S. Pat. Nos. 3,518,335, 3,769,123, 4,279,286, 4,343,342, 4,442,618 and 4,615,101 all disclose devices and techniques for applying designs, legends or other marking indicia on the sidewalls of tires during the formation of the original tire casing.

Another manner of applying markings and indicia to the sidewalls of tires is to engrave the same into the sidewall of the tire after formation of the tire. U.S. Pat. Nos. 1,567,402, 1,576,156, 3,225,810, 4,041,652 and 4,823,856 all disclose devices and techniques for perforating such an engraving-type marking.

Yet another technique for applying markings and indicia to the exterior surface of the tire is by applying individual letters, decals or appliqués to the exterior sidewall of the tire. These appliques can be in the form of sheets of individual letters heated and compressed or adhered with adhesive to the tire sidewall. Examples of such devices and techniques include U.S. Pat. Nos. 1,448,286, 1,852,964, 4,139,597, 4,252,589, 4,198,774, 4,256,159, 4,311,181, 4,317,479, 4,318,436, 4,401,145, 4,604,256, 4,461,795, 4,684,420, 4,967,818, 5,047,110, 5,049,220 and 5,058,647. While this last group of devices and techniques enable the individualization of vehicular tires due to the application of the marking indicia after formation of the tire, the devices and techniques usually require formation of the elastomer decals first, then followed by application of the decal or of individual letters one at a time through heat and/or adhesive, which again is time consuming. Moreover, many of these latter techniques, including those of utilizing adhesives, do not form an integral bond between the marking indicia and the sidewall.

U.S. Pat. No. 1,371,501 discloses a technique for utilizing a mold having removable mold members for applying marking indicia to the sidewall of the tire in an aftermarket application. However, this device and technique also requires the formation of individual metal units incorporating the entire marketing indicia, which is then useful only for applying that one particular legend or marking. This, again, is a costly and time consuming process and technique.

Japanese reference Kokai 53-25678 discloses a technique for aftermarket application of letters to tires. However, this technique is cumbersome and requires alteration of the tire before letter application.

In today's vehicular market, there is strong desire for personalizing automobiles through the use of personalized license plates and the like. While it would be highly desirable to be able to personalize vehicular tires to include aftermarket manufacturing identification or an individual vehicle owners identification or statement, there is not yet available a device or technique for enabling the aftermarket application of personalized marking indicia which is quick and inexpensive.

SUMMARY OF THE INVENTION

Accordingly, it is one object of the present invention to provide a device for producing raised lettering on elastomeric tire sidewalls.

It is another object of the present invention to provide a device for personalizing vehicular tires.

It is yet another object of the present invention to provide a device and method for the aftermarket application of marking indicia to the sidewalls of vehicular tires, which device and technique is inexpensive, quick and easy to use, and has the potential for on site utilization.

To achieve the foregoing and other objects and in accordance with the purpose of the present invention, as embodied and broadly described herein, a device for producing raised lettering on the sidewalls of an elastomeric tire is provided. The device includes a mechanism for mounting the tire in position to expose its outer sidewall. A mold member is provided having front and rear surfaces, an outer boundary, and an axial opening defining a radially inner boundary. The mold member is sized and shaped to cover the exposed outer sidewall of the tire with the front surface thereof when the tire is disposed on the mounting mechanism. A plurality of annular channels are defined in the mold member front surface spaced between the radially inner and outer boundaries of the mold member. A plurality of support members are each adapted for holding an alphanumeric elastomeric member in the form of the mirror image of a preselected alphanumeric symbol. The support members include an arrangement for selectively interlocking the support members with each other form a series of symbols into a preselected legend for producing the raised lettering. A device is provided tire securing each of the support members to one of the radially spaced channels for sliding movement therealong, the support member interlocking device providing sufficient fluctuation between connected support members to permit positioning of a series of the interlocked support members along any selected one of the spaced channels. A mechanism is provided for positioning the mold member against the outer sidewall of the tire and includes a device for aligning and centering the mold member against the life sidewall. Finally, an electrical heating element is provided within the mold member and disposed proximate the channels to heat and fuse the elastomeric symbols directly to the outer sidewall of the tire.

BRIEF DESCRIPTION OF THE DRAWINGS

The accompanying drawings, which are incorporated in and form a part of the specification, illustrate preferred embodiments of the present invention and, together with a description, serve to explain the principles of the invention. In the drawings:

FIG. 3 is a schematic illustrating the support members of the present invention interconnected and in place in the device of FIG. 2;

FIG. 4 is a top plan view of an individual numeral symbol carried by a support member constructed in accordance with the present invention;

FIG. 4A is a side schematic of pin utilized with the support member illustrated in FIG. 4;

FIG. 5 is a top-plan view of a letter carried by a support member constructed in accordance with the present invention;

FIG. 5A is a top-plan view of an elastomeric letter for use with the support member illustrated in FIG. 5;

FIG. 6 is a cross-sectional view taken substantially along line 6—6 of FIG. 5;

DETAILED DESCRIPTION OF THE PREFERRED EMBODIMENT

Figure 1:
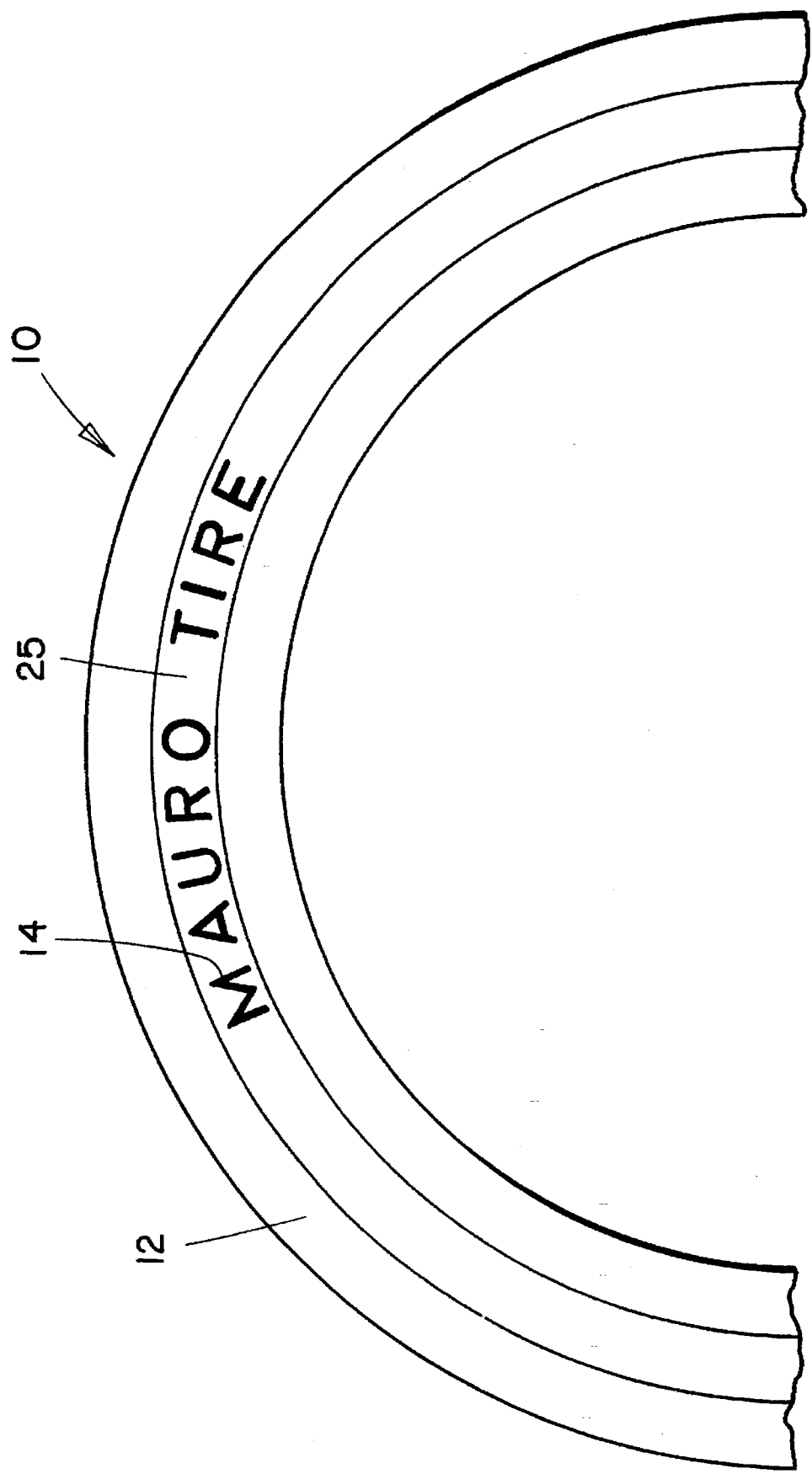
FIG. 1 is a side schematic view of a portion of a tire sidewall marked with indicia utilizing the present invention.

Referring to FIG. 1, there is illustrated therein an elastomeric or rubber tire 10 having a sidewall portion 12. A plurality of raised letters 14 are disposed along the sidewall 12 of the tire 10 in the form of indicia or a legend as illustrated therein. Each of the letters 14 consist of rubber material integrally bonded to the sidewall 12 of the tire 10.

Figure 2:
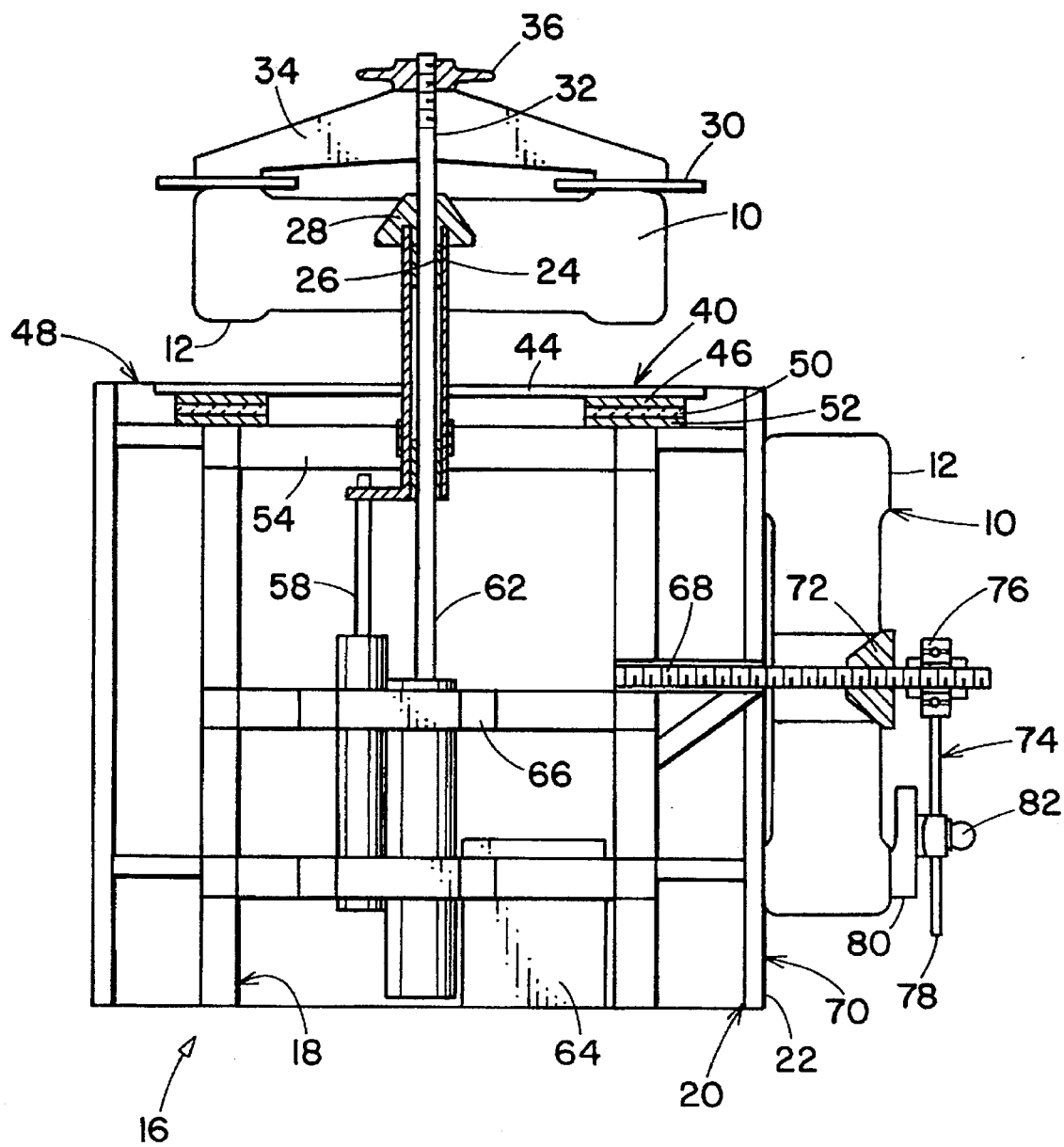
FIG. 2 is a front plan view with some parts in section and some parts in shadow, of a device constructed in accordance with the present invention.
Figure 7:
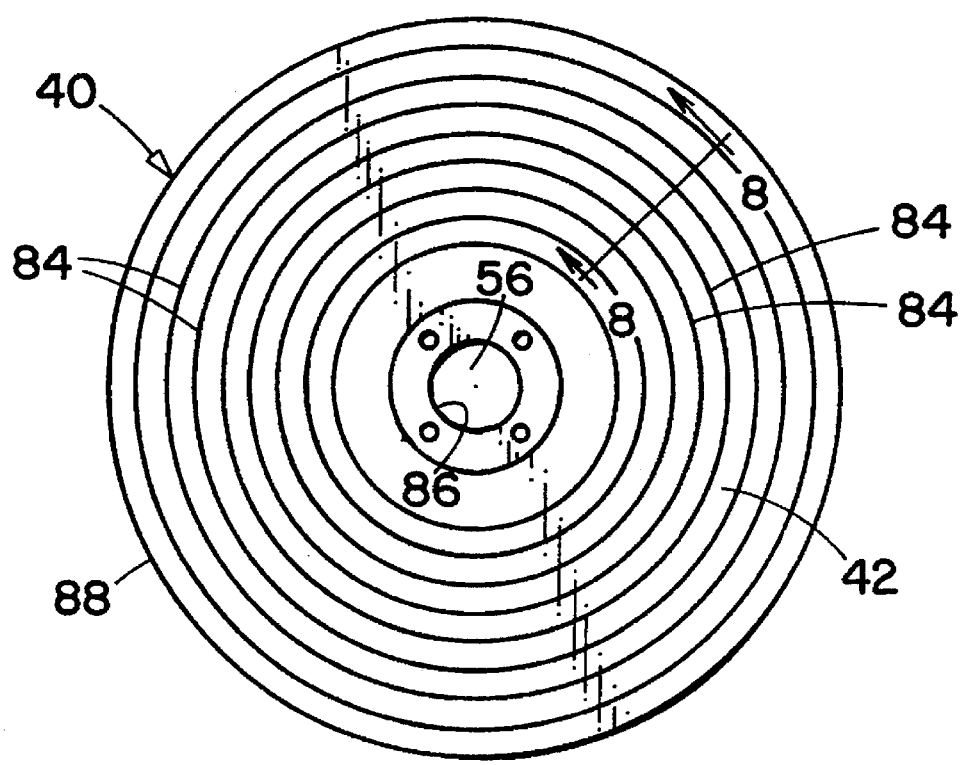
FIG. 7 is a top plan view of the mold member or plate utilized with the present invention.

Referring to FIG. 2, one preferred embodiment of the invention includes a device 16 which is provided for forming the letters 14 on the sidewall 12 of the tire 10. In the preferred embodiment, an inner frame assembly 18 is provided for supporting the weight of the device 12. An outer frame 20 is provided for supporting a sheet metal housing 22. A tire-mount arm 24 is provided and is preferably in the form of a ram in order to carry the tire 10 above the device 16. Linear bearings 26 are preferably provided within the ram arm 24, and a cone support 28 is secured to the arm 24 and is positioned so that the hub of the tire 10 may rest thereon. An annular pressure plate 30 is provided on the inner surface of the tire 10 and is connected to a central shaft 32 by a plurality of mounting arms 34. A large steel nut 36 is provided for screwing the plate 30 against the tire 10 in order to securely tighten the tire 10 against the cone 28 and hold it in place on the arm 24. The steel nut 36 is removable so that the tire 10 may be removed from the upper mounting assembly once the raised letters have been applied to the tire 10.

Referring to FIGS. 2–8, a mold member or plate 40 includes a front face 42 and is preferably constructed from a pair of interconnected members 44 and 46 as discussed in greater detail below. The mold member 40 carries the elastomeric letters 14 on its front face 42 for placement on the sidewall 12 on the tire 10. The mold member 40 is secured to the device 16 by securing it on the top surface 48 of the device 16. The mold member 40 is preferably mounted on insulation members 50 and a steel support plate 52 which is in turn carried by an upper frame member 54. The mold member 40 preferably has a central axial aperture 56 which is positioned about the ram arm 24 when placed on the device 16.

When it is desired to lower the tire 10 to meet the upper face 42 of the mounting member 40 on the machine 16, a hydraulic ram 58 is activated to lower the ram arm 24 to engage the sidewall 12 of the tire 10 with the upper face 42 of the mounting member 40. When it is desired create a compressive force between the mold member 40 and the sidewall 12, a second hydraulic ram 62 is activated which draws the mounting plate 30 down toward the upper surface 48 to compress the sidewall 12 against the mounting member 40. In preferred form, the hydraulic ram 58 is a 1.5 ton hydraulic ram, while the ram apparatus 62 is preferably a 4 ton hydraulic ram. The hydraulic rams 58, 62 are driven by a power unit 64 and are maintained in place within the unit 16 by ram supports 66.

Prior to suspending the tire 10 above the upper surface 48 of the device 16 for attachment of the elastomeric members 14, it is preferred that the sidewall 12 be roughened of buffed in order to increase the adhesion capability of the elastomeric members 14. To this end, a buffing shaft 68 is provided and extends laterally, out of the side 70 of the device 16. A cone 72 is provided to align the tire about the shaft 68 during buffing. A buffing unit 74 includes a bearing member 76 which attaches the rod 78 to the shaft 68. Secured to the rod 78 is a grinder 80. The grinder 80 may be adjusted along the length of the rod 78 by hand screw 82, depending upon the size of the tire 10. Since the tire 10 is mounted about the shaft 68 and positioned in place with the cone 72, the grinder 80 is positioned radially along the rod 78 in order to impact the sidewall 12. Once the grinder 80 is in position, it is activated and then rotated about the entire annular sidewall 12 of the tire 10 to roughen a surface 25 along the sidewall 12.

Referring more particularly to FIGS. 3–8, the mold member or plate 40 preferably has plurality of annular grooves or channels 84 disposed along the front face 42 thereof. The annular channels 84 are radially spaced from the inner boundary 86, which is defined by the axially opening 56, and the outer boundary 88. The channels 84 are preferably about ⅛ inch deep and ¼ inch in width, although any workable dimensioned channel may be used.

As previously indicated, the mold member 40 is preferably constructed from pair of annularly-shaped plates 44 and 46 which abut each other along their interior surfaces 90 and 92, respectively. The plates 44, 46 are preferably in the shape of a wheel so as to provide the central aperture 56. The plate 46 is preferably secured to the plate 44 by means of a plurality of attachment members 94 along the radial outward edge of the mold 40 and a plurality of attachment members 96 along the radially inner edge of the plate 46. In preferred form, the lower plate 46 does not extend radially inwardly to the central aperture 56 in the upper plate 44. In preferred form, the attachment members 94, 96 are in the form of removable bolts.

The interior face 90 of the plate 44 includes a plurality of annular grooves 98 formed therein. More specifically, the grooves 98 are in fact one spiral groove making three to four turns in the face 90. Likewise, a plurality of annular grooves 100, or one spiral groove, are formed in the face 92 of the plate 46. In preferred form, the grooves 98 are positioned so as to align themselves with grooves 100 when the plates 44, 46 are bolted together by the attachment members 94, 96. In this manner, a singular, spiral tubular area is formed between the plates 44, 46. A heat tube or cal rod 102 is then positioned within the spiral channel or tube formed between the grooves 98, 100 so as to form a large, singular, spiral shaped heating element within the mold 40. In preferred form, the heating tube 102 is a Chromalox tubular heater ¼ inch in diameter and which generates 1,700 watts at 240 volts.

Figure 8:
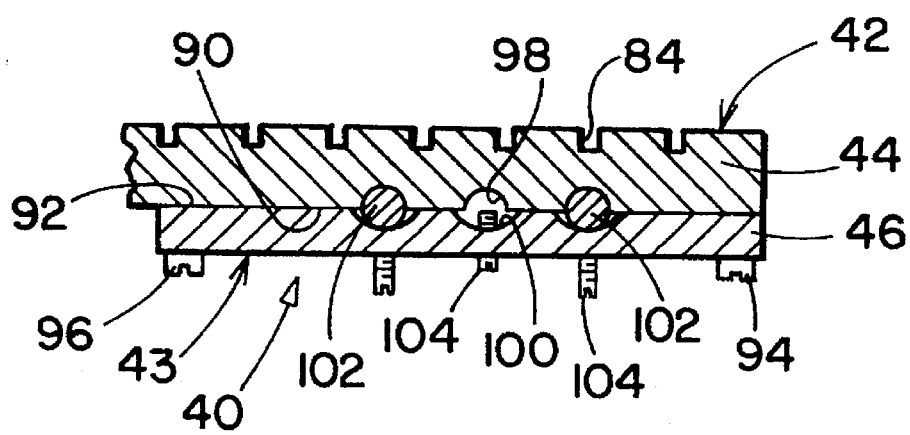
FIG. 8 is an enlarged cross-sectional view taken substantially along line 8—8 of FIG. 7.

A plurality of set screws 104 are positioned along the length of the tubular area formed by the grooves 98, 100 in order to tightened down and hold the heating coil or element 102 therewithin, as can be particularly seen in FIG. 8. The number of sets of set-screws 104 is optional, although eight (8) sets of set-screws 104 are preferred. In addition, a thermocouple is preferably attached to the plate 46 in order to measure the temperature being generated by the cal rod 102 so as monitor and control the temperature to which the elastomeric materials are being exposed, as described below.

Turning with particular reference to FIGS. 3–6, the raised letters 14 are positioned on the tire 10 utilizing the preferred structure as described below. In preferred form, a support member or plate 106 is provided and includes a recessed area 108 in the front face 110 thereof. In preferred form, the support plate 106 is constructed from aluminum and is approximately 0.25 inches thick. A recessed area 108 is specific to a particular letter or number and is preferably about 0.0020 inches deep. For example, FIG. 5 illustrates the letter "A" while FIG. 4 illustrates the numeral "1". Thus, a plurality of support members or plates 106 are required in order to have enough alphanumeric letters to compile a specific legend or name as desired. In preferred form, the alphanumeric elastomeric letters 14 are about 0.004–0.006 inches in thickness.

Each of the support members 106 has a top edge 112, a bottom edge 114, and a pair of opposed side edges 116, 118. In preferred form, the bottom edge 114 includes an aperture 120 which is sized and shaped to receive an anchor pin 122. As can be seen in FIG. 6, the anchor pin 122 is press-fit tightly within the aperture 120 so as to project substantially below the bottom surface 124 of the support member 106. In this manner, the support member 106 may be placed onto the mold 40 by simply press-fitting the anchor pin 122 into the aperture 120 of the selected support member 106 and then placing the pin 122 into the channel 84 of the mold 40. The pin 122 is sized and shaped to be firmly yet slidingly engageable with the channel 84 so as to be capable of being moved along the length thereof.

The support members 106 are capable of being interlocked with each other. To this end, the side edges 116, 118 have an interlocking mechanism that enable the support member 106 to achieve such interengagement. In preferred form, the side edge 116 includes a locking tab 126, while the side edge 118 includes a notch 128. The notches 128 are sized and shaped to receive the locking tabs 126 in such a manner that the tabs 126 must be axially dropped into the notches 128. Once the tabs 126 have been engaged within the notches 128, the tab 126 may not be laterally pulled from the notch 128. However, there is sufficient flexibility between the tab 126 and the notch 128 so that the adjacent support members 106 may fluctuate or oscillate relative to each other. More specifically, the tab 126 may rotate slightly within the notch 128. In this manner, when a series of support members 106 are interlocked together to form a specific name or legend, as illustrated in FIG. 3, the legend may be placed in any of the channels 84. Since the tangential angle between the support plates 106 increases as the channels move radially inwardly, a series of interconnected support members 106 must be capable of some flexible movement therebetween depending upon the particular channel 84 which is selected for use. This, in turn, will depend upon the size of the tire 10 on which the letters are being placed as well as the desired location of the letters 14 on the tire 10. The present invention is preferred so that the device 16 may be utilized to imprint letters on the sidewall of a wide variety of different sized tires preferably ranging from 14 inches–17 inches. In this manner, depending upon the size of the the being imprinted, the support members or plates 106 are placed at the preselected and desired location along the preselected channel 84 on the mounting member 40 so as to provide imprinted letters 14 centered along the sidewall 12 of the tire 10.

In preferred form, the support members 106 are constructed from aluminum to minimize the weight of the device 16 as well as providing a high heat conductive capability. The preferred anchor pins 122 are constructed from steel.

In operating the device 16, a preselected number and arrangement of alphanumeric symbols 14 are made along with the appropriate support members 106. The elastomeric letters 14 are then placed within the recessed areas 108 of the support members 106, and the support members 106 are then interconnected and mounted to the appropriate channel at the desired location of the mold 40. The mold 40 is then secured to the top 48 of the device 16 as previously discussed and aligned along the axial ram arm 24. The tire 10 is then placed on top of the cone 28, and the compression plate 30 is tightened down against the tire 10 by the hand-nut 36. It should be noted that the sidewall 12 of the tire 10 is first roughened at 25 by the grinder 80 as previously discussed before placing the tire 10 onto the cone 28. The heating coil 102 is then activated so as to soften the elastomeric alphanumeric members 14 that are on the mold plate 40. The tire 10 is lowered to the upper surface 42 of the mold 40 by activation of the hydraulic ram 58. Once the temperature of the plate 44 has reached the desired level, the ram 62 is activated to compress the sidewall 12 lightly against the elastomeric letters 14 to fuse the members 14 to the sidewall 12 of the tire 10. Once the letters 14 have been fused to the sidewall 12, the heating elements 102 are deactivated and the tire 10 is lifted by activating the ram 58. It should be noted that the device 16 is relatively light-weight and can be mounted to wheel assemblies (not illustrated) so as to make it readily mobile. With a plurality of elastomeric alphanumeric letters 14 having different individual letters and numbers available, any number of different combinations can be put together to create a personalized term, name or phrase to be formed on the sidewall 12 of an existing vehicular tire 10. In this manner, any tire 10 can be personalized with any type of message or name which a tire owner chooses. A wide variety of sizes of letters and numbers can be made available on the support members 106, and different kinds of colored rubbers may be utilized to provide any desired phraseology as well as coloring combination that the tire owner would choose. In preferred form, the mold plates 44, 46 are formed from aluminum to provide light-weight as well as rapid healing and cooling.

As can be seen from the above, the present invention provides an economic method and device for producing markings and indicia of any desired size, shape or verbage on vehicular tires. The present invention enables a vehicle tire owner to customize and personalize their tires with any phrase, message or name that he or she chooses. The present invention is also relatively portable and light-weight so as to permit personalization of vehicular tires on site, if desired. In this manner, the present invention provides an economic and simple way of marking the sidewall of a vehicular tire without custom mold manufacturing and the expense associated therewith.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

We claim:

1. A device for producing raised lettering on the sidewall of an elastomeric tire comprising:

means for mounting said tire in position to expose the outer sidewall thereof;

a mold member having front and rear surfaces, an outer boundary, and an axial opening defining a radially inner boundary thereof, said mold member being sized and shaped to cover the exposed outer sidewall of said tire with said front surface when said tire is disposed on said mounting means;

a plurality of annular channels defined in said mold member front surface radially spaced between its radially inner and outer boundaries;

a plurality of support members each adapted for holding an alphanumeric elastomeric member in the form of the mirror image of a preselected alphanumeric symbol and including means for selectively interlocking said support members with each other to form a series of support members and symbols into a preselected legend for producing said raised lettering;

means for securing each said support member to any one said radially spaced channel in said mold member, said support member interlocking means providing sufficient fluctuation between interlocked support members to permit a series of interlocked support members to be positioned along any selected one of said spaced channels between the radially inner and outer boundaries of said mold member to provide selective placement of said preselected legend at any desired radial position on said elastomeric tire;

means for positioning said mold member against the outer sidewall of said tire including means for aligning and centering said mold member against said sidewall; and electrical heating elements positioned within said mold member and disposed proximate said channels to heat and fuse said elastomeric symbols directly to the outer sidewall of said tire.

2. The device as claimed in claim 1, wherein each said support member includes top and bottom edges and a pair of opposed side edges, said side edges carrying said interlocking means for maintaining the positional relationship with each other when interconnected.

3. The device as claimed in claim 2, wherein said interlocking means comprises a locking tab projecting from one side edge of said support member and a matching notch disposed on the opposite side edge of said support member, each said notch being sized and shaped to receive a tab in interlocking form from an adjacent support member.

4. The device as claimed in claim 3, wherein said tabs and notches of said interlocking means are sized and shaped to permit locking engagement with each other while providing limited oscillatory movement between adjacent interlocked support members to provide said connecting fluctuation.

5. The device as claimed in claim 2, wherein said support member securing means comprise an aperture disposed in said bottom edge, and a pin sized for firm attachment to said support member through said aperture into said channel for longitudinal sliding movement within said channel.

6. The device as claimed in claim 5, wherein said support member securing means is adapted to attach to any one of said radially spaced channels.

7. The device as claimed in claim 1, wherein said device further comprises means for applying pressure between said mold member and the outer sidewall of said tire when brought into contact by said positioning means.

8. The device as claimed in claim 1, wherein said mold member is mounted to a stationary stand, and said mold member positioning means comprises a mounting assembly for said tire for moving said tire in a vertical direction into and out of contact with said stationary mold member.

9. The device as claimed in claim 1, wherein said mold member comprises a pair of interconnecting, heat conducting plates, said electrical heating elements being disposed therebetween.

10. The device as claimed in claim 9, wherein each said plate at the intersection between said plates includes a plurality of annular grooves, the grooves between said plates being aligned so as to form a plurality of annular tubes for housing a plurality of heating coils therein as said heating elements.

11. The device as claimed in claim 1, wherein the face of said support member defines an opening therein sized and shaped to hold a preselected one of said alphanumeric elastomeric members.

12. In a device for personalizing vehicular tires by producing raised alphanumeric letters on the sidewall thereof, said device including means for mounting the tire in position to expose the outer sidewall thereof, a heating plate adapted for contact against the exposed tire sidewall, and an alphanumeric symbol aligning mechanism to arrange the positioning of said raised letters on said tire sidewall, the improvement comprising:

said heating plate including a front and back surface, an outer circumferential boundary, an axial opening defining a radially inner boundary, and at least one heating coil embedded therein and adapted to heat said plate front surface;

a plurality of support members each adapted for holding an alphanumeric elastomeric letter in mirror image;

means for selectively interlocking said support members with each other to form a series of said support members into a preselected legend for producing said raised lettering;

means for positioning said support members on the front surface of said heating plate including a plurality of annular channels defined therein and spaced radially between said inner and outer boundaries; and means for securing each said support member to one said radially spaced channel in said heating plate front surface for sliding movement therewithin, said support member interlocking means providing sufficient movement between interlocked support members to permit a series of interlocked support members to be positioned along any selected one of said spaced channels to provide selective placement of said preselected legend at any desired radial position on said vehicular tire.

13. The improvement of claim 12, wherein each said support member comprises a letter plate having top and bottom edges and a pair of opposed side edges, said side edges carrying said interlocking means for maintaining the positional relationship between a plurality of said letter plates.

14. The improvement of claim 13, wherein each said letter plate is made from aluminum.

15. The improvement of claim 13, wherein said interlocking means comprises a locking tab projecting from one side edge of said letter plate and a notch disposed on the opposite side edge of said letter plate, each said notch being sized and shaped to receive a tab in interlocking form from an adjacent letter plate.

16. The improvement of claim 15, wherein said tabs and said notches of said interlocking means are sized and shaped to permit locking engagement with each other while providing limited oscillatory movement therebetween to create relative movement when positioning said letter plates in one said channel.

17. The improvement of claim 13, wherein said letter plate securing means comprise an aperture disposed in the bottom edge of said letter plate, and an anchor pin sized for firm attachment to said letter plate through said aperture into said channel for longitudinal sliding movement within said channel.

18. The improvement of claim 17, wherein said anchor pin is press fit within said letter plate aperture and is made from steel, said anchor pin being adapted for engagement within any one of said radially spaced channels.

19. A method for producing raised alphanumeric lettering on existing elastomeric tire sidewalls comprising the steps of:

forming mirror-imaged alphanumeric symbol openings in the center portion of a plurality of symbol plate members, each said member having at least one symbol and means for selectively interlocking said plate members with each other to form a series of symbols in a preselected legend for producing said raised lettering;

placing an elastomeric alphanumeric member into selected symbol openings of a plurality of selected symbol plate members;

placing a plurality of said interlocked symbol plate members having said elastomeric alphanumeric members thereon along one of a plurality of radially spaced annular channels formed in one face of a mold adapted to cover the tire sidewall, said symbol plate members representing a preselected pattern of symbols and said mold including an electric heating element embedded therein;

placing said mold face against the outer sidewall of said tire;

heating said mold and said elastomeric alphanumeric members with said mold heating element to fuse said elastomeric alphanumeric members directly against said original tire sidewall; and removing said mold from said tire sidewall thereby generating raised alphanumeric lettering in accordance with said preselected pattern.

20. The method as claimed in claim 19, wherein the surface of said tire sidewall is roughened prior to mounting said mold thereon.

21. The method as claimed in claim 19, wherein said mold member remains stationary and said tire sidewall is moved to engaged said mold member.

22. The method as claimed in claim 19, wherein said method further comprises interlocking said plate members by providing a tab on one side edge of each member and a notch on the other side edge, said notch being sized and shaped to receive a tab from an adjoining symbol plate to interlock with the same.

23. The method as claimed in claim 22, wherein each said symbol plate is maintained in position by an anchor pin passing through the bottom edge of said support plate and into one of said radially spaced channels.

* * * * *